J. W. HALL & C. BAYNES.
DETACHABLE RIM FOR RESILIENT TIRES.
APPLICATION FILED JULY 20, 1908.
1,022,842.
Patented Apr. 9, 1912.
5 SHEETS—SHEET 3.
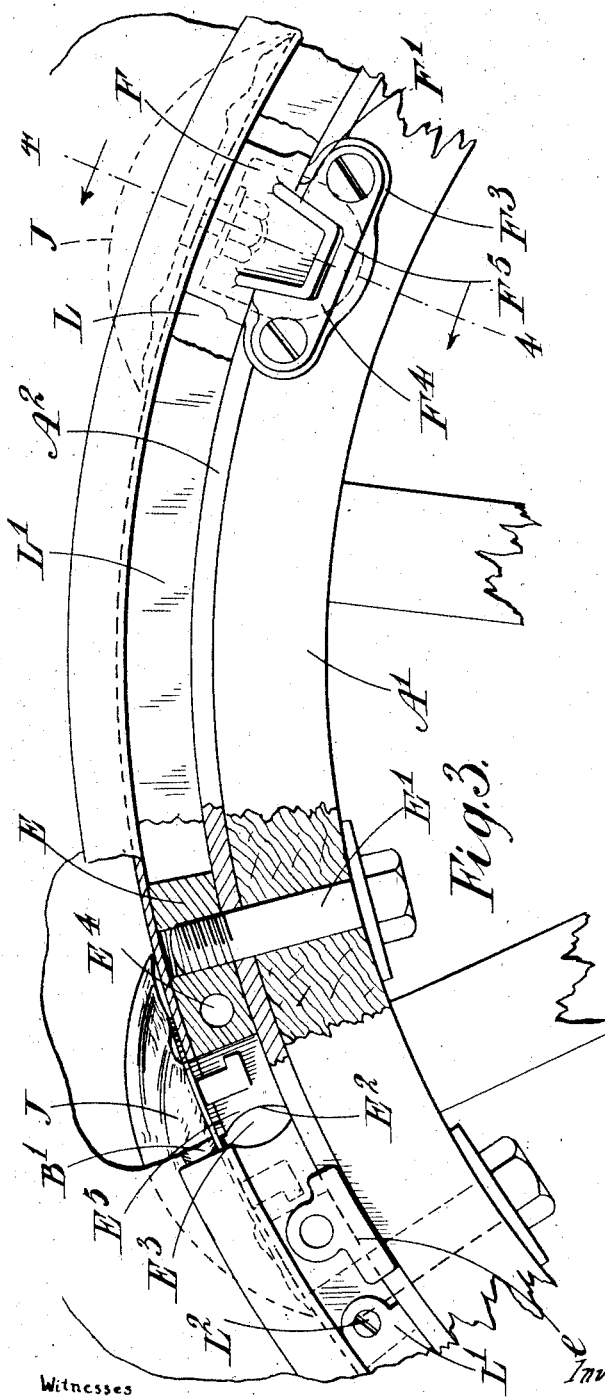
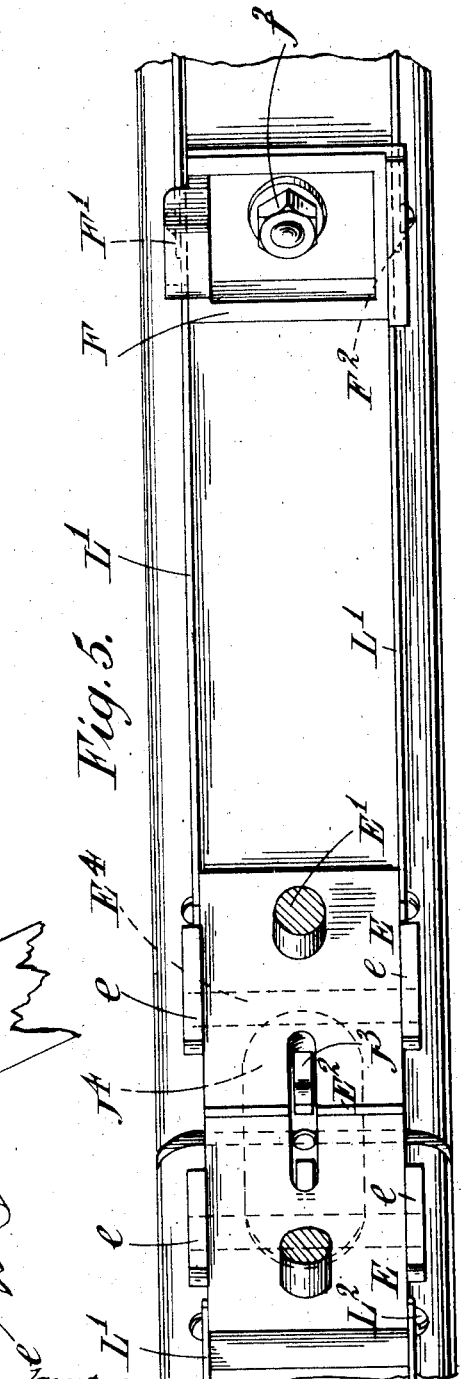
Witnesses
H. M. Baldwin
C. W. Shepard
Inventors
John William Hall
Cyril Baynes
Bakewell Byrnes Parmelee
attys J. W. HALL & C. BAYNES.
DETACHABLE RIM FOR RESILIENT TIRES.
APPLICATION FILED JULY 20, 1908.

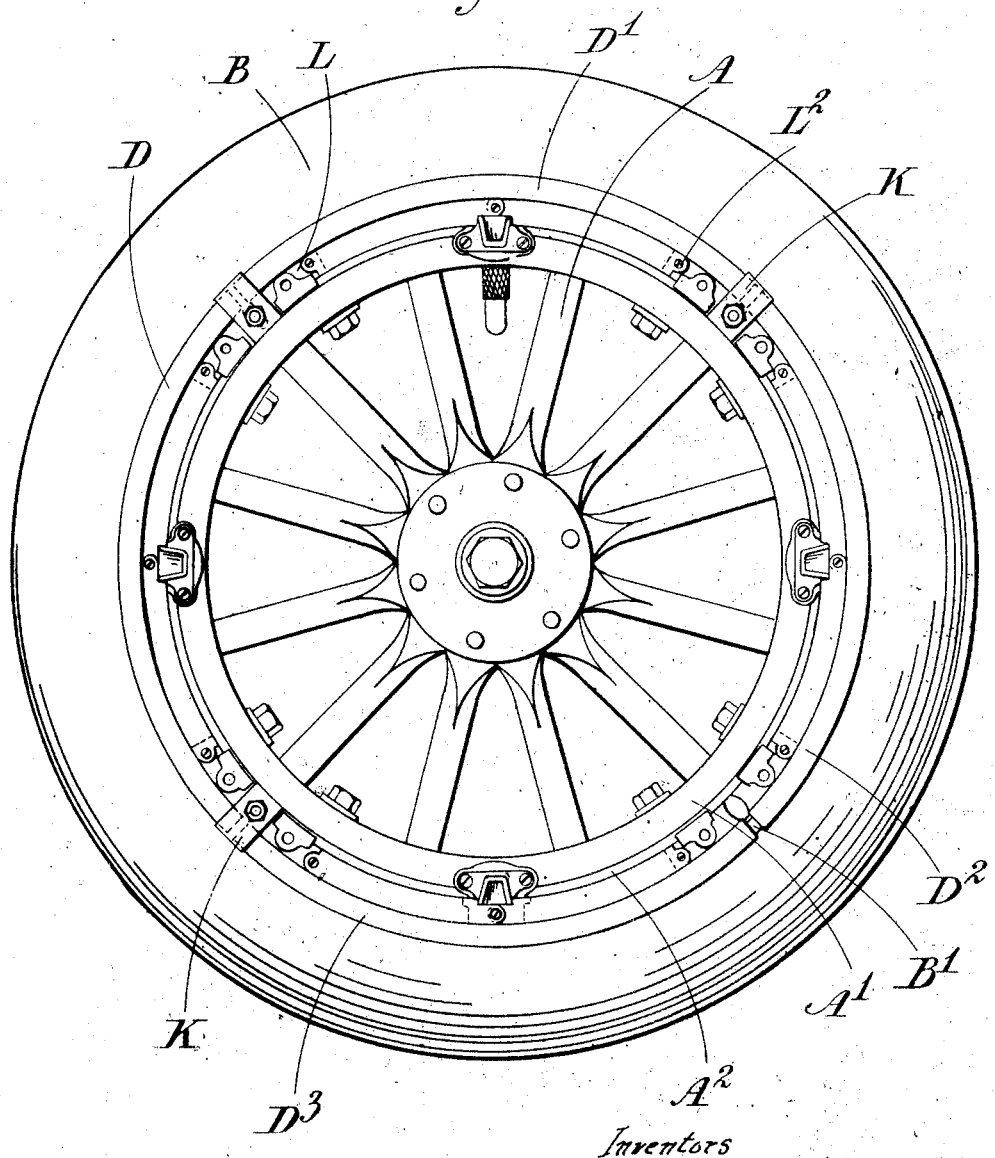

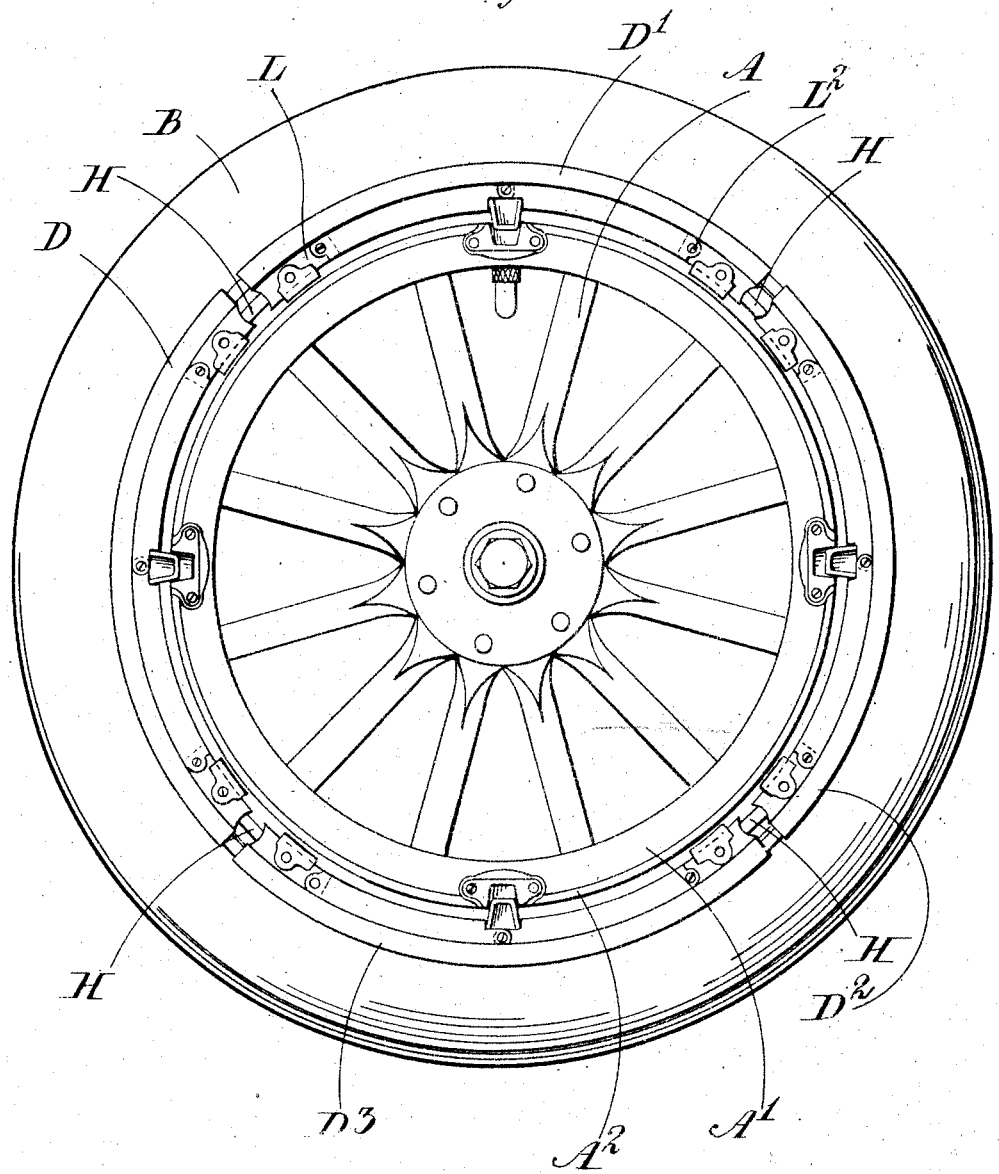

1,022,842.

Patented Apr. 9, 1912.
5 SHEETS—SHEET 4.

Witnesses

Inventors
John William Hall
Cyril Baynes

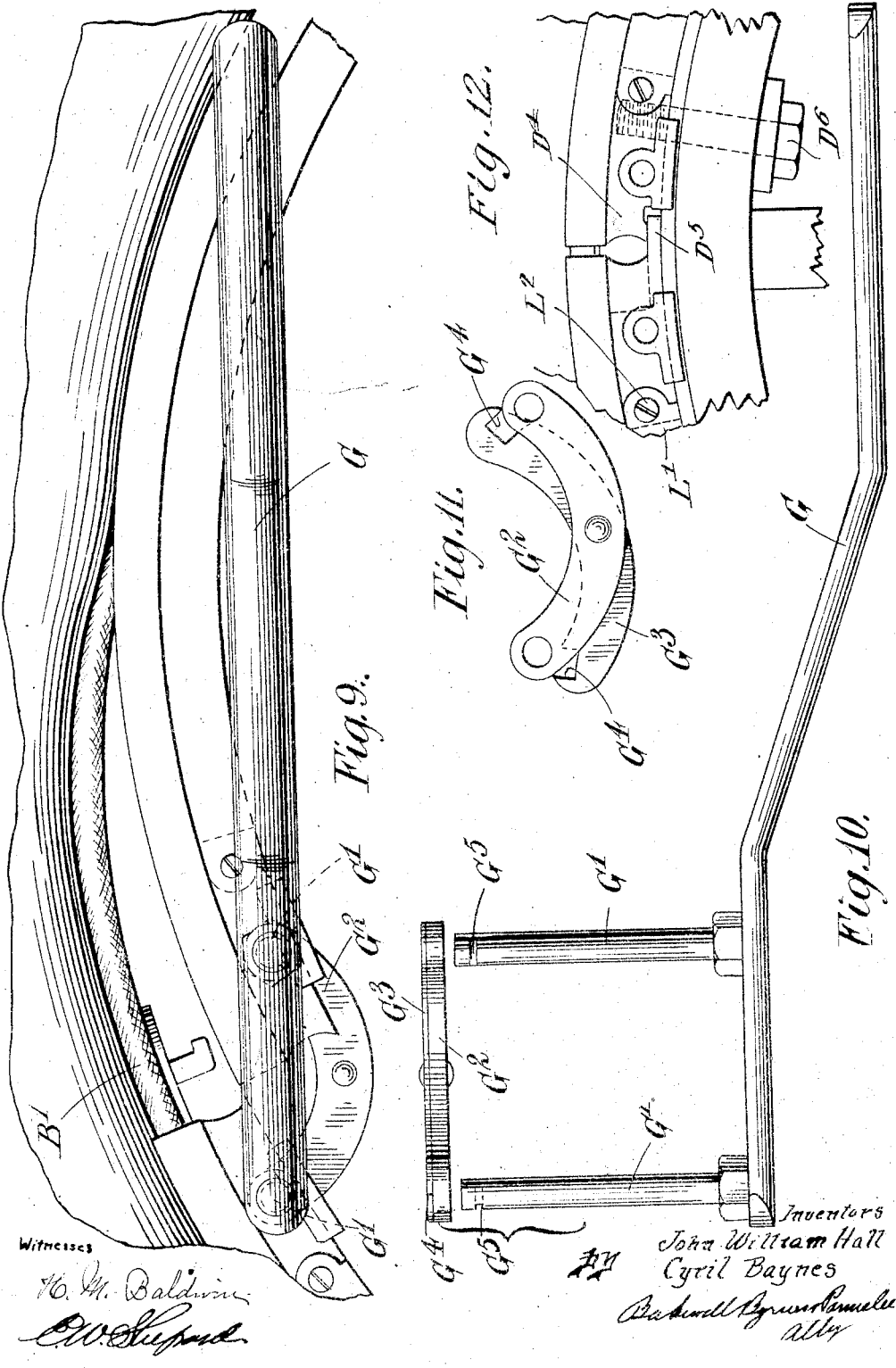

UNITED STATES PATENT OFFICE.

JOHN WILLIAM HALL AND CYRIL BAYNES, OF LONDON, ENGLAND.

DETACHABLE RIM FOR RESILIENT TIRES.

1,022,842.  Specification of Letters Patent.  Patented Apr. 9, 1912.

Application filed July 20, 1908. Serial No. 444,493.

*To all whom it may concern:*

Be it known that we, JOHN WILLIAM HALL and CYRIL BAYNES, both subjects of the King of England, residing at London, in England, have invented certain new and useful Improvements in Detachable Rims for Resilient Tires, of which the following is a specification.

This invention is for improvements in or relating to detachable rims for resilient tires and has for its object to provide a rim that can be readily removed from and applied to the felly of the wheel even though the rim or felly may be considerably out of truth.
The majority of detachable rims as at present in use require careful fitting to the felly and consequently when either the felly or the rim loses its accurate shape, it becomes difficult to apply or remove the rim, and moreover the rims are no longer, properly speaking, interchangeable.

It is well known that wheels do not retain their circularity after use and this departure from their first shape is often greater than the amount of adjustment allowed the rims.

A rim constructed according to this invention is divided transversely into separable sections that are movable bodily away from or toward each other for the purpose of expanding or contracting the rim. It thus becomes possible to provide a rim wherein a large degree of variation of size can be permitted and as the sections are independent of each other, considerable lack of truth in the felly or the particular sections may obtain without diminishing the effectiveness of the rim.

Figure 4:
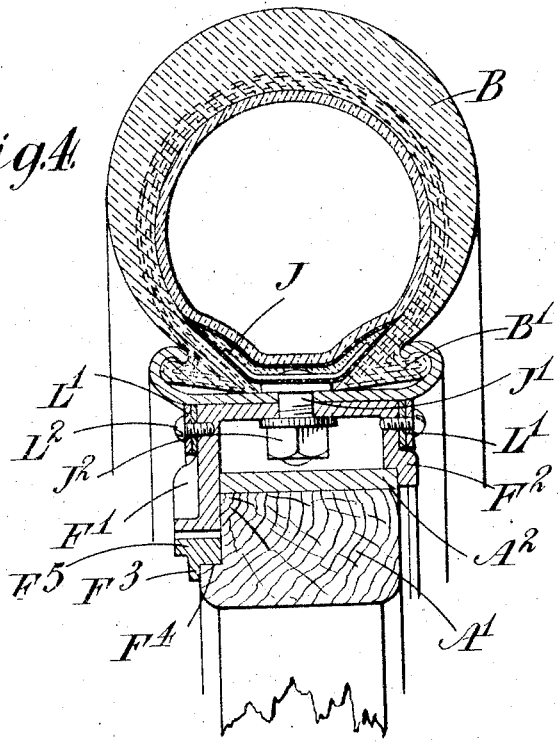
Figure 6:
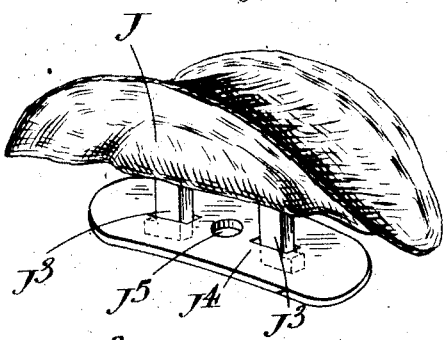
Figures 7, 8:
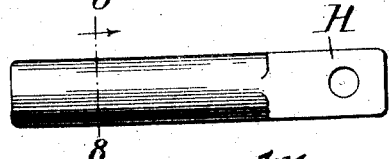

In the accompanying drawings which illustrate one method of carrying out this invention:—Figure 1 is a side elevation of the rim applied to the felly and having the tire in place; Fig. 2 is a similar view with the rim expanded ready to be removed with the tire from the felly; Fig. 3 is a side elevation of a portion of two of the rim-sections, shown on a larger scale than Figs. 1 and 2, and part being broken away for the sake of clearness; Fig. 4 is a transverse section on the line 4—4 of Fig. 3; Fig. 5 is an underside view of the parts shown in Fig. 3; Fig. 6 is a perspective view of security pad; Fig. 7 is an elevation of a rim expanding key; Fig. 8 is a section on the line 8—8 of Fig. 7; Fig. 9 is a side elevation showing the method of removing or applying the sections relatively to the tire; Fig. 10 is a plan of a tool indicated in use in Fig. 9; Fig. 11 is a side elevation of a detachable part of the tool, and Fig. 12 is a side elevation of part of a rim showing a slight modification.

Like letters indicate like parts throughout the drawings.

The wheel A with its felly $A^1$ and bonding band $A^2$ may be of any construction, these elements in themselves forming no part of the present invention. No driving gear is shown on the wheel, but the invention is equally applicable to driving or trailing wheels. The tire B is provided with beads $B^1$ and is of the pneumatic type though the invention could obviously be applied to a solid tire having suitably shaped beads.

The rim comprises four separable sections D, $D^1$, $D^2$ and $D^3$. Each of these is shaped to form part of a circle and is preferably of such length that when placed end to end the circle or approximate circle formed thereby is somewhat smaller than the felly to which the rim is to be applied. The edges of the sections are overturned in the usual way to engage the beads of the tire and on the inner face, that is the face that is toward the center of the wheel, blocks E are provided one at each end. These blocks may be brazed to the rim and are drilled and tapped to receive bolts $E^1$. The bolts pass through the felly $A^1$ of the wheel and serve to retain the sections should the tire become deflated and centrifugal action tend to throw them from the felly. Each block E has two lugs $e$ disposed on opposite sides of the rim. These lugs are inwardly directed and when the rim is in place on the felly they engage opposite sides of the felly. Approximately midway along the length of each section is another block F and this has an inwardly directed wedge-shaped lug $F^1$ on one side of the rim, and a corresponding shorter lug $F^2$ on the other side. The blocks F may also be brazed to the rim and the lugs $F^1$ $F^2$ are arranged to engage opposite sides of the felly $A^1$. For the lug $F^1$ a socket plate $F^3$ is rigidly secured to the felly. This plate has an approximately semi-circular portion $F^4$ that is let into the face of the felly, and a raised or webbed part $F^5$ that projects beyond the face. The socket in this member is formed to correspond to the wedge shape of the lug $F^1$. The lug $F^2$ merely engages the plane face of the felly, or more properly speaking, the bonding band A² thereon. The end faces of the blocks E on each section are recessed, as at E², so that when the sections are together with their ends touching, oval orifices E³ are provided at the points of contact.

The operation of this rim is as follows:— The various sections D, D¹, D², D³ are first separately applied to the tire. The inner tube having been placed within the cover and preferably slightly inflated, each of the first three sections may be readily made to engage the beads of the tire. These sections are placed end to end in contact with each other and the tire should be of such dimensions circumferentially that on attempting to introduce the last section this would be found to overlap the end of the first section. To apply this section, the tool shown in Figs. 9 to 11 is employed. This comprises a lever G carrying pins G¹. The pins are adapted to enter orifices E⁴ in the blocks E of the rim-sections and are so spaced apart that when the orifices E⁴ of two adjacent sections are engaged, the ends of the sections when brought in line will clear each other. To introduce the last section, one end is first made to engage the beads of the cover, and then one pin of the lever is made to engage the orifice E⁴ in the free end of the section while the other pin engages the orifice E⁴ in the nearest end of the adjacent section, as shown in Fig. 9. With the parts in the position illustrated in this figure, the lever G is then raised, whereupon the section being made to bear with considerable pressure against the beads, is forced over the latter and brought into place.

To prevent the pins G¹ from becoming bent while the lever is in use, a bridge-piece G² is placed over them on that side of the rim not occupied by the lever. This bridge-piece is bent, as shown in Fig. 11, to avoid fouling a further tool hereinafter described that is used with this rim. The bridge-piece has pivoted to it a locking member G³ having jaws G⁴ one at each end that engage recesses G⁵ in the pins G¹ when rocked in one direction and thus prevent the bridge-piece from accidental removal.

Each of the sections of the rim is found to hold securely to the beads of the tire and the sections are preferably of such length that they are held firmly against each other by the tire which has been stretched to bring the last section into place. The complete ring thus formed is too small for the felly and to get the rim thereon it is necessary to expand it. For this purpose, keys H (Figs. 7 and 8) are employed. Each key has an oval body portion and a squared head. The keys are of such dimensions that they can be readily introduced into the oval orifices E³ between the sections. After their introduction, each key is given a quarter turn by means of a wrench or other device engaging the squared head. The sections are thus bodily moved away from each other which has the effect of expanding the rim sufficiently to pass over the felly. The relative dimensions of the rim thus expanded and the felly are shown in Fig. 2, and it will be seen that when so expanded the lugs e are held clear of the bonding band A¹ of the felly. The whole rim can thus be slid axially into place until the lugs F¹ which are only provided on one side of the rim, engage their respective sockets F³ that are secured to the felly. The lugs F² are of practically the same dimensions as the lugs e and therefore offer no obstacle to bringing the rim into place.

To introduce the valve, the rim is canted relatively to the wheel when bringing it into place so that the valve is first passed through an orifice provided for it in the felly and then the whole rim can be brought into proper position by an axial movement. The keys H can now be turned into the position in which they were introduced when the various segments of the rim will be forcibly contracted by the tire on to the felly of the wheel. The lugs F¹ will then lie snugly in the sockets F³, as shown in Figs. 1 and 3, and constitute the driving means between the felly and rim. The lugs e will also engage opposite sides of the felly and the lugs F² will fall into place and engage that face of the felly which is remote from the lugs F¹.

It is found that the rim so secured is sufficiently rigid for all practical purposes when the tire is inflated, but should deflation occur, it is possible that centrifugal action might throw the segments away from the felly and thus permit the rim and tire to come off the wheel. To prevent this, the bolts E¹ are screwed into the blocks E as already described. In addition to the bolts E¹, a device similar to the usual security bolts may be employed. This as is well known comprises a plate J whose edges are upturned to engage the faces of the beads of the cover on the side toward the inner tube. These plates are usually covered with a suitable material to prevent abrasion of the tube and to each plate a bolt J¹ is secured. This bolt passes through the rim, and in the present instance it is preferably arranged in such a position that it also passes through one of the blocks F. The block is recessed for lightness and the same recess provides room for a nut J² whereby the bolt may be secured. Conveniently the valve is arranged to pass through one of these blocks and the blocks are situated approximately midway of the length of the sections because at this point there is found to be very little endwise movement when operating the keys H. The effect of operating both the keys allotted to any one segment is that the whole segment is moved bodily in a radial direction, both ends being displaced relatively to its adjacent segments, but when one key only has been operated there may be a certain amount of endwise movement as well as a radial movement of the end operated.

To prevent the tube from blowing through between the ends of any two rim-sections when the sections on the felly do not meet, a device similar to the security bolts is provided, but instead of a single bolt $J^1$ extending therefrom it carries two headed pins $J^3$. Over these pins a plate $J^4$ is placed and the heads on the pins prevent the two parts from becoming detached. The opposed ends of the blocks E are recessed at $E^5$ to receive these pins $J^3$ and the plate $J^4$ is made to lie between the beads $B^1$ of the tire and the rim. The object of this plate is to prevent the security piece J from being displaced by centrifugal action should deflation occur. In these circumstances the security piece J could only move forward radially until the heads on the pins came against the plate $J^4$ and as this would still be held in place by the beads on the tire further movement would be rendered impossible.

Each plate $J^4$ has an orifice $J^5$ that lies opposite the orifice $E^3$ between the sections and affords a means by which the plate can be moved in one direction or the other by introducing a suitable implement in case either of the pins $J^3$ should not be in proper position to enter the slot $E^3$ provided for it.

The orifices $E^3$ between the rim-sections may be left open, but if it is desired to close them to prevent the entrance of water or dirt, any simple means may be used for this purpose. In Fig. 1 plates K are shown. These are thin plates shaped to the contour of the rim and one is placed on each side of the orifice that is to be closed and a bolt then passed through and secured by a nut so that the two plates are rigidly held in position.

Instead of employing a bolt $E^1$ at each end of each rim-section, the sections may if desired be arranged to overlap as shown in Fig. 12 wherein one end of a section $D^4$ is shown as lying over a projecting portion $D^5$ of the neighboring section. With this arrangement it is only necessary to have one bolt $D^6$ for each section, as will be readily understood.

The use of the blocks E and F on the rim-sections results in a space L between the rim and felly. This may be closed in by any suitable means such as thin plates $L^1$ that are secured to the blocks by screws $L^2$.

It will be seen that in addition to affording a detachable rim, the separable sections permit ready access to any part of the inner tube that may be damaged. Having detached the rim by the reverse operation from that described, it is only necessary to remove the particular section that lies opposite the damaged part. To do this, the lever G is employed. To aid the introduction of the pins $G^1$ into their respective orifices a key H may be placed in the particular orifice $E^3$ that lies between the sections that are to be separated. By partly or completely turning the key the orifices $E^4$ which when the ends of the sections are touching are too close together to engage the pins, may be brought into proper position for the introduction of the latter. After removing the nut $J^2$ of the security bolt allotted to the section to be removed and having detached the bolts $E^1$ of the same section, it is then only necessary to move the lever G in the direction toward the center of the wheel when the section will be readily detached from the beads of the cover.

It should be noted that the rim with the inflated tire upon it can be carried as a "spare" as it is not necessary to mount the rim on the felly before inflation. It is found that although the sections are quite separate and are only held together by the tire, full inflation is possible as if the rim were formed in one piece.

What we claim as our invention and desire to secure by Letters Patent is:—

1. A rim divided transversely into a plurality of independent sections each arranged to be applied from one side of the tire and comprising a base portion to lie over the outer periphery of the wheel felly and having side flanges to receive the tire, which rim can as a whole be slid laterally on to and off from the felly, means operative when all the sections are in engagement with the tire to displace a section bodily in such direction as to expand the rim, and means for locking the sections to the felly when thereon, substantially as set forth.

2. A rim divided transversely into a plurality of independent sections each arranged to be applied from one side of the tire and comprising a base portion to lie over the outer periphery of the wheel felly and having side flanges to receive the tire, which rim can as a whole be slid laterally on to and off from the felly, the length of the sections being such that the diameter of the ring formed by placing them end to end with their concave faces toward a common center is less than the diameter of the felly, and means operative when all the sections are in engagement with the tire to displace a section bodily in such direction as to expand the rim, substantially as set forth.

3. The combination of a resilient tire having beaded edges, a rim divided transversely into a plurality of independent sections each arranged to be applied from one side of the tire and comprising a base portion to lie over the outer periphery of the wheel felly and having inturned side flanges to engage the beads on the tire which rim can as a whole be slid laterally on to and off from the felly, the rim sections capable of being separately introduced end to end within and held by the flanges on the tire before either the rim or tire is placed on the felly, and means operative to displace a section bodily relatively to the other sections when all are in place within the tire in such direction as to expand the rim and stretch the tire, substantially as set forth.

4. A rim divided transversely into a plurality of independent sections each comprising a base portion to lie over the outer periphery of the wheel felly and having side flanges to receive the tire which rim can as a whole be slid laterally on to and off from the felly, each section having a recess in its end face of greater diameter in the radial direction of the rim than in the circumferential direction, the recess on one end face being arranged to register with that on the opposed end face of the adjacent section, whereby a transverse channel is provided between them, and a plurality of rotatable eccentric pins introduced into these channels of such dimensions as to approximately fill the same whereby as the pins are rotated, when all the sections are in position within the tire, the sections engaged by the pins are forced apart in a circumferential direction, substantially as and for the purpose set forth.

5. The combination of, a rim transversely divided into a plurality of independent sections having inturned edges to engage beads on the tire and transverse recesses on their end faces, the cross-section of each recess being of greater diameter in the radial direction of the rim than in the circumferential direction and the recess on one end face being arranged to register with that on the opposed end face of the adjacent section whereby a transverse channel is provided between them, and a plurality of rotatable eccentric pins introduced into these channels of such dimensions as to approximately fill the same whereby as the pins are rotated, when all the sections are in position within the tire, the sections engaged by the pins, are displaced bodily relatively to their companions; substantially as and for the purpose set forth.

6. The combination of, a rim transversely divided into a plurality of independent sections having inturned edges to engage beads on the tire the whole rim being adapted to take over a felly and one of these members (the rim and felly) having lugs rigidly secured thereto and adapted to engage the other member in such manner as to prevent lateral displacement therefrom in either direction, and means, operative when all the sections are in engagement with the tire, to displace the sections bodily in such direction as to expand the rim, the degree of expansion thus obtained being sufficient to enable the rim and felly with the fixed lugs to be brought into proper relative position for engagement or disengagement as required, substantially as set forth.

7. A rim divided transversely into a plurality of independent sections each arranged to be applied from one side of the tire and comprising a base portion to lie over the outer periphery of the wheel felly and having side flanges to receive the tire, the arrangement being such that the rim can be slid as a whole laterally on to and off from the felly, and key seats in the ends of each of the various sections arranged to receive keys for forcing the various sections apart to increase the diameter of the rim without changing the radius of such sections, for the purpose set forth.

In testimony whereof we have signed our names to this specification in the presence of two subscribing witnesses.

JOHN WILLIAM HALL.
CYRIL BAYNES.

Witnesses:
A. M. HAYWARD,
W. H. DERRIMAN.